United States Patent
Yang et al.

(10) Patent No.: US 12,433,948 B2
(45) Date of Patent: Oct. 7, 2025

(54) AQUEOUS PHARMACEUTICAL FORMULATIONS

(71) Applicant: RICHTER GEDEON NYRT, Budapest (HU)

(72) Inventors: Jheng-Gang Yang, Taiwan (CN); Wen-Cheng Chang, Taiwan (CN); Jiung-Liang Liu, Taiwan (CN)

(73) Assignee: RICHTER GEDEON NYRT, Budapest (HU)

( * ) Notice: Subject to any disclaimer, the term of this patent is extended or adjusted under 35 U.S.C. 154(b) by 779 days.

(21) Appl. No.: 17/290,092

(22) PCT Filed: Oct. 24, 2019

(86) PCT No.: PCT/CN2019/113112
§ 371 (c)(1),
(2) Date: Apr. 29, 2021

(87) PCT Pub. No.: WO2020/088346
PCT Pub. Date: May 7, 2020

(65) Prior Publication Data
US 2021/0393783 A1    Dec. 23, 2021

Related U.S. Application Data

(60) Provisional application No. 62/753,084, filed on Oct. 31, 2018.

(51) Int. Cl.
*A61K 47/18* (2017.01)
*A61K 9/00* (2006.01)
*A61K 47/26* (2006.01)
*C07K 16/28* (2006.01)

(52) U.S. Cl.
CPC .......... *A61K 47/183* (2013.01); *A61K 9/0019* (2013.01); *A61K 47/26* (2013.01); *C07K 16/2866* (2013.01)

(58) Field of Classification Search
CPC .................................................. A61K 47/183
USPC ...................................................... 424/130.1
See application file for complete search history.

(56) References Cited

FOREIGN PATENT DOCUMENTS

| | | |
|---|---|---|
| CN | 102869346 A | 1/2013 |
| CN | 107760760 A | 3/2018 |
| EP | 2526963 A1 | 11/2018 |
| JP | 2013541594 | 11/2013 |
| JP | 7411652 | 1/2024 |
| KR | 10-2012-0133376 | 12/2012 |
| KR | 10-2013-0086628 | 8/2013 |
| WO | WO 2011/085158 A2 * | 7/2011 |
| WO | 2017147293 A1 | 8/2017 |
| WO | 2018060210 A1 | 4/2018 |
| WO | 2018078162 A1 | 5/2018 |

OTHER PUBLICATIONS

The Actemra® (tocilizumab) label (revised Aug. 2017).*
Sheppard et al (Human Vaccines & Immunotherapeutics, 2017, 13(9): 1972-1988).*
CN102869346a google English translation (obtained Jan. 31, 2024).*
Bolli et al (Biologicals, 2010, 38: 150-157).*
Nishimoto et al (Therapeutic Antibodies. A Handbook of Experimental Pharmacology, 2008, p. 151-160).*
PCT International Search Report and Written Opinion for PCT Patent Application No. PCT/CN2019/113112 dated Feb. 1, 2020. 10 Pages.
Kim, A.N. et al., "Comprehensive Evaluation of Etanercept-Stability In Various Concentrations with Biophysical Assessment," International Journal of Pharmaceutics, vol. 460, Nov. 21, 2013, pp. 108-118.
Lim, J.Y. et al., "Evaluation of Etanercept Degradation Under Oxidative Stress and Potential Protective Effects of Various Amino Acids," International Journal of Pharmaceutics, vol. 492, Jul. 14, 2015, pp. 127-136.
Pan, Q, "Investigation on Active Protection of Monoclonal Antibody Etanercept with Molecular Simulation" Chinese Master's Thesis Full-Text Database Engineering Science and Technology I, No. 5, May 15, 2018 , Abstract, pp. 7-8.
Extended European search report in European Application No. 19879433.1, dated Jul. 5, 2022, 9 pages.
Chen B, Bautista R, Yu K, Zapata GA, Mulkerrin MG, Chamow SM. Influence of histidine on the stability and physical properties of a fully human antibody in aqueous and solid forms. Pharm Res. Dec. 2003;20(12):1952-60, 9 pages.
Jorgensen L, Hostrup S, Moeller EH, Grohganz H. Recent trends in stabilising peptides and proteins in pharmaceutical formulation—considerations in the choice of excipients. Expert Opin Drug Deliv. Nov. 2009;6(11):1219-30, 13 pages.
Imaeda et al., "The development of ACTEMRA 162 mg Syringe/Auto-Injector for SC Injection", PDA Journal of GMP and Validation in Japan vol. 19, No. 2 (2017), 9 pages.
Japanese Patent Office, "Notification of Reasons for Rejection", issued in connection with Japanese Patent Application No. 2023-218125, dated Jan. 7, 2025, 8 pages.

(Continued)

Primary Examiner — Sean E Aeder
(74) Attorney, Agent, or Firm — MCANDREWS HELD & MALLOY, LTD

(57) ABSTRACT

Provided are an aqueous pharmaceutical formulation comprising an antibody specific to the receptor of interleukin (IL)-6 (for example, Tocilizumab) and an effective amount of histidine for stabilizing the antibody. Said histidine is present in the aqueous pharmaceutical formulation at a concentration of 50 mM to 200 mM so as to achieve the stabilizing effect.

12 Claims, 3 Drawing Sheets

Specification includes a Sequence Listing.

(56) References Cited

OTHER PUBLICATIONS

Korean Patent Office, Office action in Application No. 10-2021-7016403 dated Apr. 14, 2025, with translation.

* cited by examiner

SEQUENCE LISTING

<160> NUMBER OF SEQ ID NOS: 2

<210> SEQ ID NO 1
<211> LENGTH: 449
<212> TYPE: PRT
<213> ORGANISM: Artificial Sequence
<220> FEATURE:
<223> OTHER INFORMATION: synthesized heavy chain

<400> SEQUENCE: 1

Gln Val Gln Leu Gln Glu Ser Gly Pro Gly Leu Val Arg Pro Ser Gln
1               5                   10                  15

Thr Leu Ser Leu Thr Cys Thr Val Ser Gly Tyr Ser Ile Thr Ser Asp
            20                  25                  30

His Ala Trp Ser Trp Val Arg Gln Pro Pro Gly Arg Gly Leu Glu Trp
        35                  40                  45

Ile Gly Tyr Ile Ser Tyr Ser Gly Ile Thr Thr Tyr Asn Pro Ser Leu
    50                  55                  60

Lys Ser Arg Val Thr Met Leu Arg Asp Thr Ser Lys Asn Gln Phe Ser
65                  70                  75                  80

Leu Arg Leu Ser Ser Val Thr Ala Ala Asp Thr Ala Val Tyr Tyr Cys
                85                  90                  95

Ala Arg Ser Leu Ala Arg Thr Thr Ala Met Asp Tyr Trp Gly Gln Gly
            100                 105                 110

Ser Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Lys Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Asp Glu Leu Thr Lys Asn Gln Val Ser Leu Thr

```
            355                 360                 365
Cys Leu Val Lys Gly Phe Tyr Pro Ser Asp Ile Ala Val Glu Trp Glu
        370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

Lys

<210> SEQ ID NO 2
<211> LENGTH: 214
<212> TYPE: PRT
<213> ORGANISM: Artificial Sequence
<220> FEATURE:
<223> OTHER INFORMATION: synthesized light chain

<400> SEQUENCE: 2

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Ser Ser Tyr
                20                  25                  30

Leu Asn Trp Tyr Gln Gln Lys Pro Gly Lys Ala Pro Lys Leu Leu Ile
            35                  40                  45

Tyr Tyr Thr Ser Arg Leu His Ser Gly Val Pro Ser Arg Phe Ser Gly
        50                  55                  60

Ser Gly Ser Gly Thr Asp Phe Thr Phe Thr Ile Ser Ser Leu Gln Pro
65                  70                  75                  80

Glu Asp Ile Ala Thr Tyr Tyr Cys Gln Gln Gly Asn Thr Leu Pro Tyr
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210
```

AQUEOUS PHARMACEUTICAL FORMULATIONS

CROSS-REFERENCE TO RELATED APPLICATIONS

The present application is a National Phase Entry of PCT International Application No. PCT/CN2019/113112 which was filed on Oct. 24, 2019, which claims priority to U.S. Provisional Patent Application No. 62/753,084, filed Oct. 31, 2018, both of which are hereby incorporated by reference in their entireties.

DESCRIPTION OF THE TEXT FILE SUBMITTED ELECTRONICALLY

The contents of the text file submitted electronically herewith are incorporated herein by reference in their entirety: A computer readable format copy of the Sequence Listing (filename: 65714US01_Sequencelisting asfiledtxt.txt, date recorded: Oct. 24, 2019, file size 6 kilobytes).

BACKGROUND OF THE INVENTION

1. Field of the Invention

The present disclosure in general relates to the field of pharmaceutical formulations. More specifically, the present disclosure relates to an aqueous pharmaceutical composition comprising an antibody specific to the receptor of interleukin (IL)-6, such as Tocilizumab, and an effective amount of histidine to stabilize the antibody.

2. Description of Related Art

Throughout the past decade, protein-based therapeutics have emerged as a key driver of growth in the pharmaceutical industry, in which monoclonal antibodies have become the fastest growing segment of protein drugs around the world. Despite the success in biotechnology, there are still intractable challenges in the development of the antibody therapeutics. Unlike small molecules (e.g., compounds), which may be administered via oral, transdermal and/or pulmonary routes, antibody therapeutics are typically administered by injection. Considering the limitations of size, physiological complexity and bioavailability, the injected antibodies must be prepared at high concentrations. However, proteins at high concentrations are unstable, and prone to degradation (such as deamination), aggregation and/or precipitation that in turn decreases manufacturability and complicates antibody delivery.

For the purpose of maintaining the purity and stability of the high-concentration antibody therapeutics, different stabilizers (e.g., glycerol, glucose, galactose, xylitol, sorbitol, mannitol, sucrose, trehalose, sodium sulfate, potassium sulfate, ionic or non-ionic surfactants, polyhydric alcohols, polyethylene glycol, and/or dimethyl sulfoxide (DMSO)) are required to be added in the buffer solution. However, the complex composition of medication might result in the difficulty of manufacturing process and quality management, and also increase the risk of adverse drug reactions.

In view of the foregoing, there exists in the related art a need for a simpler and more stable aqueous formulation comprising high concentration of antibody.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, one aspect of the disclosure is directed to an aqueous pharmaceutical formulation that comprises an antibody, and histidine for stabilizing the antibody. According to embodiments of the present disclosure, the antibody binds to the receptor of interleukin (IL)-6, and the histidine is present in the aqueous pharmaceutical formulation at a concentration of 50 mM to 200 mM.

According to preferred embodiments of the present disclosure, the histidine is present in the aqueous pharmaceutical formulation at the concentration of 50 mM to 150 mM. Preferably, the histidine is present in the aqueous pharmaceutical formulation at the concentration of 60 mM to 130 mM. More preferably, the histidine is present in the aqueous pharmaceutical formulation at the concentration of 60 mM to 125 mM.

According to certain embodiments of the present disclosure, the antibody is Tocilizumab that is present in the aqueous pharmaceutical formulation at a concentration of 0.1 to 300 mg/ml. In one working example, the Tocilizumab is present in the aqueous pharmaceutical formulation at the concentration of 180 mg/ml.

Optionally, the aqueous pharmaceutical formulation of the present disclosure may further comprise a surfactant that is present in the aqueous pharmaceutical formulation at a concentration of 0.01 to 0.05% on a weight/volume (w/v) basis. According to one specific example, the surfactant is polysorbate, and is present in the aqueous pharmaceutical formulation at a concentration of 0.03% (w/v).

Still optionally, the aqueous pharmaceutical formulation of the present disclosure may further comprise an amino acid that is present in the aqueous pharmaceutical formulation at a concentration of 1 mM to 150 mM, wherein the amino acid is selected from the group consisting of, lysine, aspartate, proline, phenylalanine, alanine, threonine, leucine, asparagine, glutamate, glutamine, serine, tryptophan, arginine, methionine, and valine. According to some embodiments of the present disclosure, the aqueous pharmaceutical formulation comprises 70 mM of lysine, threonine, serine, proline, valine, or alanine.

According to certain embodiments, the aqueous pharmaceutical formulation has a pH of 5.0 to 6.5.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where.

DETAILED DESCRIPTION OF THE INVENTION

Figure 1A:
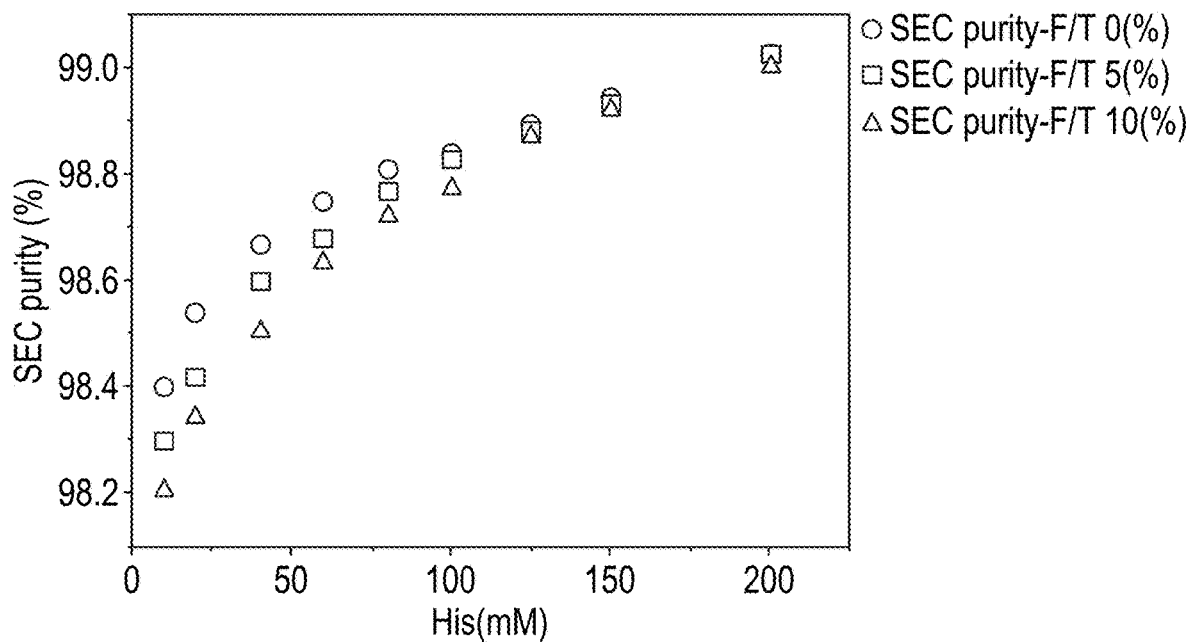
FIG. 1 depicts the percentages of purity (SEC purity, Panel (a)), high molecular weight species (SEC HMWs, Panel (b)) and low molecular weight species (SEC, LMWs, Panel (c)) of formulations containing specified concentrations of histidine according to Example 2.1 of the present disclosure, wherein the formulations were subjected to 0 freeze-thaw cycle (F/T 0), 5 freeze-thaw cycles (F/T 5), or 10 freeze-thaw cycles (F/T 10)

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

I. Definition

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Also, unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about". Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques.

The term "pharmaceutical formulation" as used herein refers to formulations that are in such form as to permit the biological activity of the active ingredient (e.g., the antibody) to be effective, and contain no additional components toxic to the subjects to which the formulation would be administered. The term "pharmaceutical formulation" includes a pharmaceutically acceptable composition for administration to a subject (e.g., a human), and/or for research purposes. The administration to the subject may include, without limitation, topical, sublingual, rectal, vaginal, transcutaneous, subcutaneous, oral, inhaled, intranasal, pulmonary, intravenous, enteral or parenteral. According to certain embodiments of the present disclosure, the present pharmaceutical formulation is subcutaneously administered to the subject.

The term "antibody" is used in the broadest sense and specifically covers monoclonal antibodies, polyclonal antibodies, multi-specific antibodies (e.g., bi-specific antibodies), and antibody fragments so long as they exhibit the desired biological activity, that is, to specifically bind to an antigen (e.g., the receptor of IL-6) when it preferentially recognizes its target antigen in a complex mixture of proteins and/or other molecules. According to certain embodiments of the present application, the antibody of this invention is a monoclonal antibody that specifically recognizes the receptor of IL-6. Antibodies are typically tetramers of immunoglobulin molecules. However, the antibody in the present invention may alternatively exist in a variety of forms including, for example, variable fragment (Fv), single chain variable fragment (scFv), antibody-binding fragment (Fab) and F(ab)$_2$, as well as single chain antibody and humanized antibody. An antibody can be chimeric, humanized, human and/or affinity matured.

The term "amino acid" as used herein refers to either natural and/or unnatural or synthetic amino acids. When amino acids are not designated as either D- or L-amino acids, the amino acid is either an L-amino acid or could be either a D- or L-amino acid, unless the context requires a particular isomer. Further, the notation used herein for the amino acids are those abbreviations commonly used in the art.

As used herein, the term "stabilize" refers to an improvement in the stability of an antibody (e.g., the anti-IL6R antibody of the present disclosure), which is necessary to approach or achieve a stable state. More specifically, the term "stabilize" refers to make or hold an antibody in a stable, firm or steadfast state, and/or to maintain the antibody at about a given or substantially unfluctuating level, about a given or substantially unfluctuating quality and/or about a given or substantially unfluctuating quantity. The term "stabilize" includes, for example, suppressing a decrease in activity and/or function of the antibody in the case where the antibody is stored in the solution for a predetermined period of time.

II. Description of the Invention

The present disclosure is directed to an aqueous pharmaceutical formulation comprising an antibody specific to the receptor of IL-6, i.e., an anti-IL6R antibody; and an effective amount of histidine for stabilizing the antibody.

In general, the antibody of the present pharmaceutical formulation may be produced by any method known to the person having ordinary skill in the art; for example, via immunization or vaccination protocol (i.e., initiating an immune response in an animal by administrating a polypeptide of interest (e.g., the receptor of IL-6) to the animal followed by isolation and purification of the thus-produced antibody), hybridoma cells (i.e., cultivating hybridoma cells to produce and secrete the antibody in the culture medium), and recombinant DNA technology (i.e., introducing an expression vector containing a polynucleotide that encodes the antibody or a fragment of the antibody into a cell so as to express the antibody or the fragment thereof in the cell).

According to certain embodiments of the present disclosure, the antibody of the present pharmaceutical formulation is Tocilizumab, which is produced by the recombinant DNA technology. In these embodiments, the heavy and light chains of the thus-produced Tocilizumab respectively comprised the amino acid sequences of SEQ ID NOs: 1 and 2.

According to embodiments of the present disclosure, the histidine is present in the aqueous pharmaceutical formulation at a concentration of 50 mM to 200 mM so as to achieve the stabilizing effect; for example, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, or 200 mM. Preferably, the histidine is present in the aqueous pharmaceutical formulation at the concentration of 50 mM to 150 mM. Preferably, the histidine is present in the aqueous pharmaceutical formulation at the concentration of 60 mM to 130 mM. More preferably, the histidine is present in the aqueous pharmaceutical formulation at the concentration of 60 mM to 125 mM.

The antibody is present in the aqueous pharmaceutical formulation at a concentration of 0.1 to 300 mg/ml; such as, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300 mg/ml. Preferably, the antibody is present in the aqueous pharmaceutical formulation at a concentration of 1 to 240 mg/ml. More preferably, the antibody is present in the aqueous pharmaceutical formulation at a concentration of 100 to 220 mg/ml. According to some working examples, the antibody is present in the aqueous pharmaceutical formulation at a concentration of 180 mg/ml.

The aqueous pharmaceutical formulation of the present disclosure has a pH of 5.0 to 6.5, i.e., the pH value of the present pharmaceutical formulation may be 5.0, 5.1, 5.2, 5.3, 5.4, 5.5, 5.6, 5.7, 5.8, 5.9, 6, 6.1, 6.2, 6.3, 6.4, or 6.5. According to one embodiment, the present pharmaceutical formulation has a pH of 5.0. According to another embodiment, the present pharmaceutical formulation has a pH of 5.4. According to still another embodiment, the present pharmaceutical formulation has a pH of 5.7. According to further another embodiment, the present pharmaceutical formulation has a pH of 6.0.

Basically, the aqueous pharmaceutical formulation of the present disclosure is formulated into a liquid form for intravenous, cutaneous or subcutaneous infection, for example, in the form of a pyrogen-free, parenterally acceptable aqueous solution. The parenteral preparation can be enclosed in ampoules, syringes, or multiple dose vials made of glass or plastic. Depending on desired purposes, the antibody of the present aqueous pharmaceutical formulation may by formulated with a surfactant, stabilizer, buffer, or other additives (e.g., preservative or antioxidant) known to those of skill in the art.

In an optional embodiment, the aqueous pharmaceutical formulation of the present disclosure further comprises a surfactant. The concentration of the surfactant in the present pharmaceutical formulation preferably ranges between 0.01 to 0.05% (w/v), for example, 0.01%, 0.02%, 0.03%, 0.04%, or 0.05%. Non-limiting surfactants suitable to be employed in the present pharmaceutical formulation include, but are not limited to, polysorbate (e.g., polysorbate 20, polysorbate 40, polysorbate 60, and polysorbate 80), polyoxyethylene, hydrogenated castor oil, polyoxyethylene glycol hydrogenated castor oil, polyoxyethylene glycol hydrogenated castor oil, polyoxyethylene stearate, polyoxyethylene distearate, polyoxyethylene oleate, polyoxyethylene oleate, polyoxyethylene dioleate, polyoxyethylene oleyl alcohol, polyoxyethylene stearyl alcohol, polyoxyethylene cetearyl alcohol, polyoxyethylene-polyoxypropylene co-polymers, polyoxyethylene-polyoxypropylene co-polymers block-co-polymers, and a combination thereof. According to one working example, the surfactant is polysorbate (e.g., polysorbate 80) that is present in the present pharmaceutical formulation at a concentration of 0.03% (w/v).

According to one alternative embodiment of the present disclosure, in addition to histidine, the aqueous pharmaceutical formulation of the present disclosure further comprises an amino acid selected from the group consisting of, lysine (Lys, L), aspartate (Asp, D), proline (Pro, P), phenylalanine (Phe, F), alanine (Ala, A), threonine (Thr, T), leucine (Leu, L), asparagine (Asn, N), glutamate (Glu, E), glutamine (Gln, Q), serine (Ser, S), tryptophan (Trp, W), arginine (Arg, R), methionine (Met, M), histidine (His, H), and valine (Val, V). According to the preferred embodiments of the present disclosure, said amino acid is present in the aqueous pharmaceutical formulation at a concentration of 1 mM to 150 mM, e.g., 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145, or 150 mM. In one specific example, the aqueous pharmaceutical formulation comprises 70 mM of lysine, threonine, serine, proline, valine, or alanine.

Additionally or alternatively, the aqueous pharmaceutical formulation of the present disclosure may further comprise a stabilizer, for example, glucose, galactose, xylitol, sorbitol, mannitol, sucrose, trehalose and etc., that is present in the aqueous pharmaceutical formulation at a concentration of 1 to 10% (w/v), e.g., 1, 2, 3, 4, 5, 6, 7, 8, 9, or 10%. According to one example of the present disclosure, the aqueous pharmaceutical formulation comprises 3% sucrose.

According to embodiments of the present disclosure, the antibody is formulated in a buffer, which may be an acetate buffer, succinate buffer, citrate buffer, histidine buffer, phosphate buffer, tris(hydroxymethyl)aminomethane (Tris) buffer, or a combination thereof. The concentration of the buffer in the present pharmaceutical formulation preferably ranges between 5 to 250 mM; that is, the concentration of the buffer may be 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or 250 mM. According to one embodiment of the present disclosure, the buffer is the histidine buffer. According to another embodiment of the present disclosure, the buffer is the acetate buffer.

According to certain embodiments of the present disclosure, after storage at 25° C. for 4 or 8 weeks, the purity of the antibody in the present pharmaceutical formulation is higher than 98%, i.e., more than 98% of the monomer form of the antibody is retained. According to alternative embodiments of the present disclosure, after storage at 40° C. for 4 weeks, the purity of the antibody in the present pharmaceutical formulation is higher than 95%, i.e., more than 95% of the monomer form of the antibody is retained. According to some embodiments of the present disclosure, after storage at 40° C. for 8 weeks, the purity of the antibody in the present pharmaceutical formulation is higher than 92%, i.e., more than 92% of the monomer form of the antibody is retained.

According to certain embodiments of the present disclosure, the antibody of the aqueous pharmaceutical formulation of the present invention is characterized in having less than 5% aggregate formation as determined by size exclusion chromatography-high performance liquid chromatography (SEC-HPLC) after 8 weeks of storage at 40° C. According to alternative embodiments of the present disclosure, the antibody of the aqueous pharmaceutical formulation of the present invention is characterized in having less than 3% aggregate formation as determined by SEC-HPLC after 8 weeks of storage at 40° C. According to some embodiments of the present disclosure, the antibody of the aqueous pharmaceutical formulation of the present invention is characterized in having less than 2% aggregate formation as determined by SEC-HPLC after 4 weeks of storage at 40° C.

The following Examples are provided to elucidate certain aspects of the present invention and to aid those of skilled in the art in practicing this invention. These Examples are in no way to be considered to limit the scope of the invention in any manner. Without further elaboration, it is believed that one skilled in the art can, based on the description herein, utilize the present invention to its fullest extent. All publications cited herein are hereby incorporated by reference in their entirety.

EXAMPLE

Materials and Methods

Tocilizumab IgG Protein

The anti-IL6R antibody, Tocilizumab IgG protein, used in the formulations was expressed in CHO cell. CHO cells cultured in a 2,000 liter bioreactor, and fed-batch process was conducted. The Tocilizumab IgG protein generated by the above process was purified by a standard series chromatography steps known in the art, including affinity chromatography, ion-exchange chromatography and mix-mode chromatography. Flow filtration was further performed to concentrate the above purified protein using ultra-filtration membrane, a diafiltration was conducted to exchange buffer selected.

The heavy and light chains of the thus-produced Tocilizumab IgG protein respectively comprised the amino acid sequences of SEQ ID NOs: 1 and 2.

Thermal Stress Test

The thermal stress, as known as heat acceleration test, was applied on the test formulations. In brief, the formulation containing 180 mg/ml anti-IL6R antibody (Tocilizumab IgG protein) and specified component (e.g., histidine) were subjected to 2-8° C., 25° C. or 40° C. incubation for 0, 2, 4 or 8 weeks. The purity of each test formulation was analyzed by size exclusion chromatography-high Performance Liquid Chromatography (SEC-HPLC).

Freeze-Thaw Stress Test

The freeze-thaw stress was applied on the test formulations. The process was accomplished by freezing the formulation containing 180 mg/ml anti-IL6R antibody (Tocilizumab IgG protein) and specified component (e.g., histidine) at −80° C. for at least 8 hours, and subsequently thawing under room temperature. The cycle of freezing and thawing was repeated for 5 or 10 times consecutively. Then, the purity of each test formulation was analyzed by SEC-HPLC.

SEC-HPLC

SEC-HPLC was employed to monitor the protein aggregation and fragmentation, and determine the purity of Tocilizumab protein. Each sample was diluted with formulation buffer to a final concentration of 10 mg/ml and subjected to HPLC analysis. The experimental HPLC parameters were summarized in Table 1.

TABLE 1

| Parameters for HPLC analysis | |
|---|---|
| Mobile phase | phosphate buffer at about pH 7.0 |
| Wash buffer | ddH2O |
| Storage buffer | 10% Methanol |
| Column | TSKGEL ® G3000 SWXL |
| Guard column | SECURITYGUARD ™ cartridges |
| Column temperature | Ambien |
| Flow rate | ≤1 ml/min |
| Run time | ≤1 hour |
| Detector wavelength | 280 nm |
| Amount of injected sample | about 200 μg Anti-IL6R antibody(Tocilizumab) |
| Gradient profile | Isocratic |

The main peak shown in the SEC profile represented the monomer Tocilizumab protein, the pre-peak represented high molecular weight (HMW) aggregate formation of Tocilizumab protein that has risk to induce immune response after being introduced into human body, and the post-peak represented the degraded low molecular weight (LMW) fragment of Tocilizumab protein. In general, the main peak was proportional to the purity and stability of the formulation.

Example 1 Effect of Amino Acids on the Stability of Tocilizumab

To evaluate the influence of amino acids on the stabilization of IgG protein, the anti-IL6 receptor antibody, Tocilizumab, was dissolved in water at a concentration of about 180 mg/ml and a pH value of 5 with the addition of 40 mM of aspartate (Asp), proline (Pro), phenylalanine (Phe), alanine (Ala), threonine (Thr), leucine (Leu), asparagines (Asn), glutamate (Glu), glutamine (Gln), serine (Ser), tryptophan (Trp), arginine (Arg), histidine (His), or valine (Val). The samples prepared were stored at 40° C. or 25° C. for 4 weeks, followed by SEC-HPLC analysis. The results were respectively summarized in Tables 2 and 3.

TABLE 2

| SEC-HPLC analysis of formulations containing additional amino acid after storage at 40° C. for 4 weeks | | | | | |
|---|---|---|---|---|---|
| Amino acid | HMW (%) | Increases HMW (%) | Main-peak (%) | Increases Main-peak (%) | LMW (%) | Increases LMW (%) |
| Asp | 2.58 | 1.33 | 93.47 | −5.17 | 3.95 | 3.84 |
| Pro | 2.19 | 0.95 | 94.05 | −4.61 | 3.77 | 3.67 |
| Phe | 2.45 | 1.25 | 93.29 | −5.41 | 4.26 | 4.16 |
| Ala | 2.30 | 1.03 | 94.22 | −4.41 | 3.48 | 3.37 |
| Thr | 2.41 | 1.17 | 93.80 | −4.85 | 3.80 | 3.70 |
| Leu | 2.68 | 1.44 | 93.21 | −5.44 | 4.11 | 4.01 |
| Asn | 2.40 | 1.20 | 93.39 | −5.31 | 4.21 | 4.11 |

TABLE 2-continued

SEC-HPLC analysis of formulations containing additional amino acid after storage at 40° C. for 4 weeks

| Amino acid | HMW (%) | Increases HMW (%) | Main-peak (%) | Increases Main-peak (%) | LMW (%) | Increases LMW (%) |
|---|---|---|---|---|---|---|
| Glu | 2.61 | 1.43 | 93.09 | −5.63 | 4.30 | 4.19 |
| Gln | 2.54 | 1.37 | 93.51 | −5.22 | 3.94 | 3.84 |
| Ser | 2.34 | 1.18 | 93.82 | −4.92 | 3.85 | 3.75 |
| Trp | 3.15 | 2.00 | 92.40 | −6.36 | 4.45 | 4.35 |
| Arg | 2.21 | 1.03 | 93.90 | −4.82 | 3.89 | 3.79 |
| His | 1.96 | 0.78 | 94.00 | −4.72 | 4.05 | 3.94 |
| Val | 2.32 | 1.10 | 94.06 | −4.62 | 3.62 | 3.51 |

TABLE 3

SEC-HPLC analysis of formulations containing additional amino acid after storage at 25° C. for 4 weeks

| Amino acid | HMW (%) | Increases HMW (%) | Main-peak (%) | Increases Main-peak (%) | LMW (%) | Increases LMW (%) |
|---|---|---|---|---|---|---|
| Asp | 1.55 | 0.30 | 98.18 | −0.46 | 0.26 | 0.15 |
| Pro | 1.37 | 0.13 | 98.38 | −0.28 | 0.26 | 0.16 |
| Phe | 1.35 | 0.15 | 98.40 | −0.30 | 0.25 | 0.15 |
| Ala | 1.46 | 0.19 | 98.30 | −0.33 | 0.24 | 0.13 |
| Thr | 1.37 | 0.13 | 98.39 | −0.26 | 0.24 | 0.14 |
| Leu | 1.45 | 0.21 | 98.30 | −0.35 | 0.25 | 0.15 |
| Asn | 1.34 | 0.14 | 98.40 | −0.30 | 0.26 | 0.16 |
| Glu | 1.43 | 0.25 | 98.30 | −0.42 | 0.28 | 0.17 |
| Gln | 1.40 | 0.23 | 98.34 | −0.39 | 0.26 | 0.16 |
| Ser | 1.34 | 0.18 | 98.40 | −0.34 | 0.26 | 0.16 |
| Trp | 1.14 | −0.01 | 98.60 | −0.16 | 0.26 | 0.16 |
| Arg | 1.32 | 0.14 | 98.42 | −0.30 | 0.26 | 0.16 |
| His | 1.12 | −0.06 | 98.62 | −0.10 | 0.26 | 0.15 |
| Val | 1.41 | 0.19 | 98.34 | −0.34 | 0.25 | 0.14 |

The data of Table 2 indicated that after 4 weeks of storage at 40° C., the formulation containing proline, alanine, threonine, serine, arginine, histidine or valine had less monomer (main peak %) decrease as compared with the formulations containing other amino acids. The formulation containing histidine, arginine, proline, alanine or valine exhibited less HMW aggregates (HMW %; His: 1.96%, Arg: 2.21%, Pro: 2.19%, Ala: 2.30%, Val: 2.32%) and less aggregation increase (increase HMW %; His: 0.78%, Arg: 1.03%, Pro: 0.95%, Ala: 1.03%, Val: 1.10%) than the formulations containing other amino acids (Table 2). The formulation containing tryptophan had the highest HMW aggregates (HMW % of Trp: 3.15%) and aggregation increase (increase HMW % of Trp: 2.0%) (Table 2), and it was speculated that tryptophan would not improve the stability of anti-IL6R antibody in the formulation when being subjected to thermal stress.

However, the data of Table 3 showed that there were no significant differences in the increase of aggregates and fragments (increase HMW % and increase LMW %) among the test formulations after storage at 25° C. for 4 weeks. Supposedly, samples storing at room temperature might take more time to exhibit the trend of stability observed in the 40° C. storage condition.

In conclusion, compared with other amino acids, the antibody formulation containing 40 mM of histidine has the least purity loss (monomer loss), HMW aggregates and aggregation increase. The data suggested that the performance of histidine to stabilize the anti-IL6R antibody in the formulation was the best among different amino acids, and was even better than arginine which is one of the stabilizers used in the commercial Tocilizumab-containing formulation.

Example 2 Effect of Histidine Concentration on the Stability of Tocilizumab

To assess the influence of histidine concentration on the stability of IgG protein, 180 mg/ml of Tocilizumab was formulated in different concentration (including 10, 20, 40, 60, 80, 100, 125, 150 and 200 mM) of histidine buffer at a pH value of 6.0 with the addition of 0.03% (w/v) polysorbate 80. The thus-prepared formulations were respectively subjected to freeze-thaw stress (0, 5 or 10 cycles) and thermal stress (2-8° C., 25° C. or 40° C. for 0, 2 or 4 weeks) followed by the analysis of SEC-HPLC to determine the purity of Tocilizumab. The data were respectively depicted in FIGS. 1 and 2.

2.1 Analysis of Freeze-Thaw Stress

Figure 1B:
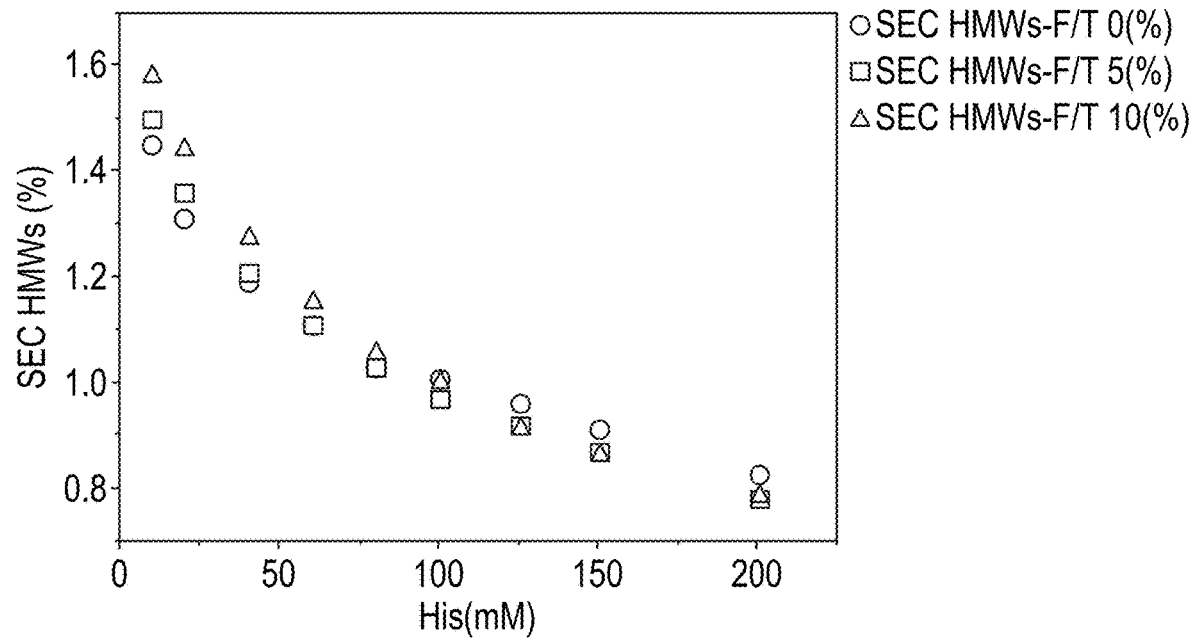
Figure 1C:
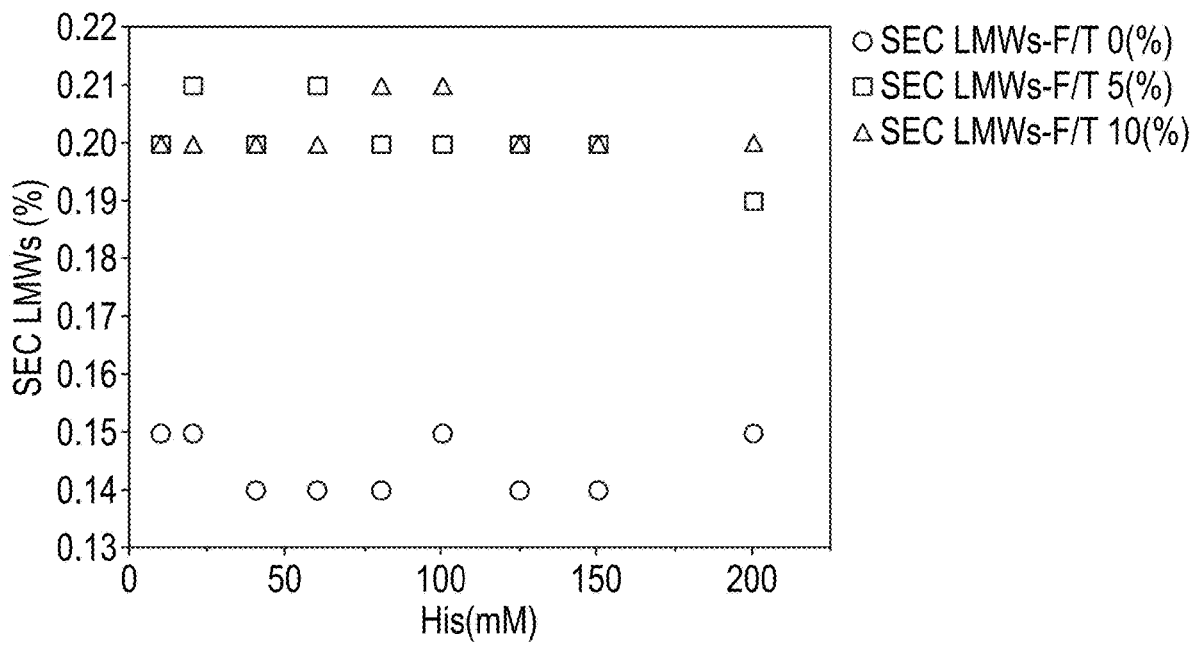

As shown in Panels (a) and (b) of FIG. 1, Tocilizumab monomer (purity %) increased with the increase of the histidine concentration, and the high molecular weight species (HMW %) decreased with the increase of the histidine concentration no matter before or after treating with 5 cycles or 10 cycles of freeze-thaw stress. Besides, there were no significant differences with the low molecular weight species between samples having different concentration of histidine after treating with 5 cycles or 10 cycles of freeze-thaw stress (Panel (c) of FIG. 1).

By analyzing the amount of HMW and LMW formed in each test formulations, a positive correlation was observed between the purity and concentration of histidine buffer, indicating the protective effect of histidine on purity of Tocilizumab. Moreover, the histidine buffer inhibited the formation of high molecular weight species, rather low molecular weight species, under 5 or 10 cycles of Freeze-thaw stress (Panels (b) and (c) of FIG. 1). These results clearly demonstrated the effect of histidine concentration on protein size variants formed under Freeze-thaw stress.

2.2 Analysis of Thermal Stress

Figure 2A:
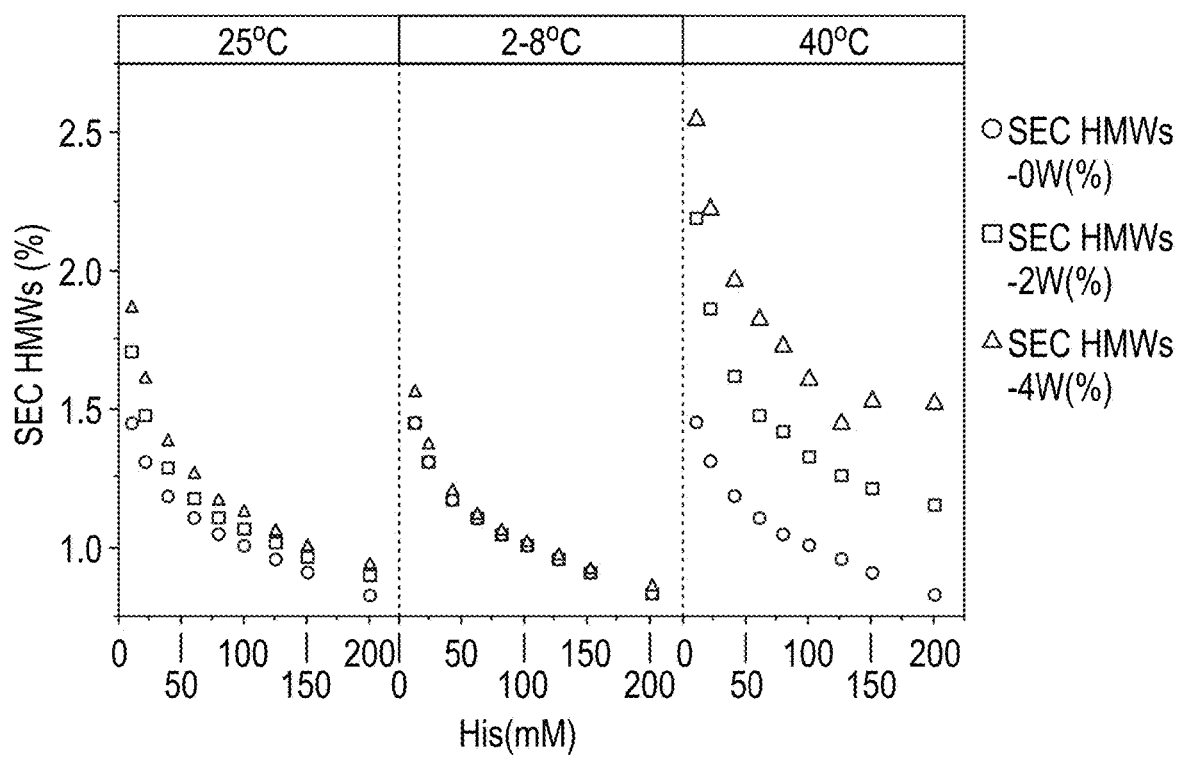
FIG. 2 depicts the percentages of high molecular weight species (SEC HMWs, Panel (a)), purity (SEC purity, Panel (b)) and low molecular weight species (SEC LMWs, Panel (c)) of formulations containing specified concentrations of histidine according to Example 2.2 of the present disclosure, wherein the formulations were subjected to 2-8° C., 25° C. or 40° C. for 0 week (0 W), 2 weeks (2 W) or 4 weeks (4 W).
Figure 2B:
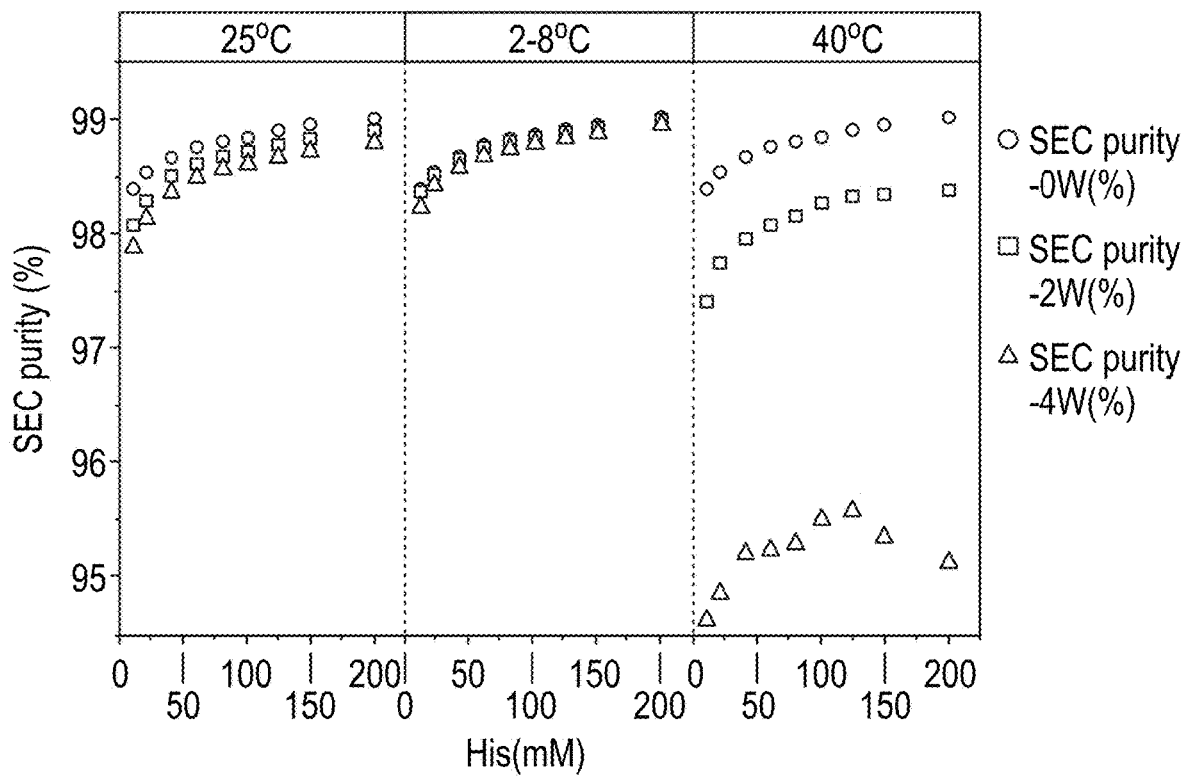
Figure 2C:
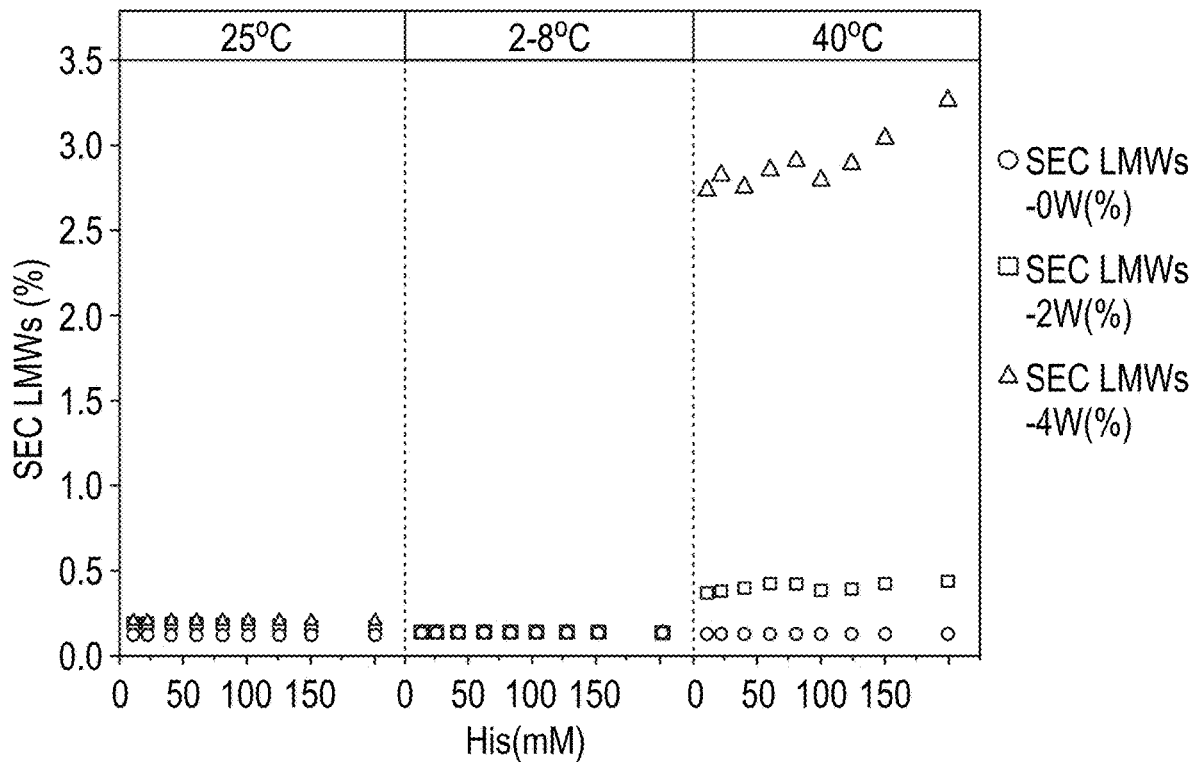

As shown in Panel (a) of FIG. 2, with increasing the concentration of histidine buffer, the formation of high molecular weight species (or aggregates) (HMW %) was decreased and the purity was increased gradually, and storage at 40° C. significantly induced more generation of high molecular weight species than storage at 2-8° C. and 25° C.

It was also found that when samples were stored at 40° C. for 4 weeks, the formulation containing 125 mM histidine buffer had the lowest high molecular weight species and highest protein purity. However, as the histidine concentration up to 150 mM and 200 mM, the low molecular weight species (or fragments) (LMW %) increased and the protein purity decreased (Panels (b) and (c) of FIG. 2).

The results of Examples 2.1 and 2.2 demonstrated that increasing the concentration of histidine contained in the formulation could inhibit the formation of aggregates and improve the stability of Tocilizumab. However, when formulations were stored at high temperature, the histidine concentration of greater than 150 mM might induce the generation of fragments.

Example 3 Effect of the Histidine in Combination with Other Amino Acids on the Stability of Tocilizumab To assess the effect of histidine in combination with amino acids other than arginine and methionine on antibody stability, 180 mg/ml of Tocilizumab was formulated in high concentration histidine buffer (80 mM) at pH 6.0 with the addition of 0.03% polysorbate 80 (w/v, serving as a surfactant), and further amino acid with the concentration of 70 mM selected from histidine, lysine, threonine, serine, proline, valine and alanine was added into the formulation. The test formulations were subjected to the heat acceleration test (stored at 25° C. or 40° C. for 8 weeks), and then analyzed by SEC-HPLC. The data were respectively summarized in Tables 4 and 5.

HMW (%), and the test formulation containing 150 mM histidine (80 mM histidine buffer with 70 mM histidine addition) had the least purity loss and the least increases HMW (%) after being subject to 8 weeks of storage at 25° C. (increases main-peak (%): −0.68%; increases HMW (%): 0.48%) and 40° C. (increases main-peak (%): −6.23%; increases HMW (%): 1.17%).

As the trend observed in Example 2.2, the higher concentration of histidine added in the liquid formulation, the less monomer loss and aggregate increase of anti-IL6R Ab.

TABLE 4

SEC-HPLC analysis of formulations containing specified concentration of amino acid after storage at 25° C. for 8 weeks

| Sample | Sum HMW (%) | Increases HMW (%) | Main-peak (%) | Increases Main-peak (%) | Sum LMW (%) | Increases LMW (%) |
|---|---|---|---|---|---|---|
| 80H | 1.37 | 0.60 | 98.30 | −0.81 | 0.33 | 0.20 |
| 80H-70His (150H) | 1.22 | 0.48 | 98.46 | −0.68 | 0.33 | 0.20 |
| 80H-70Lys | 1.29 | 0.54 | 98.39 | −0.73 | 0.32 | 0.19 |
| 80H-70Thr | 1.34 | 0.59 | 98.33 | −0.79 | 0.33 | 0.21 |
| 80H-70Ser | 1.33 | 0.58 | 98.34 | −0.79 | 0.33 | 0.21 |
| 80H-70Pro | 1.30 | 0.54 | 98.37 | −0.75 | 0.33 | 0.21 |
| 80H-70Val | 1.35 | 0.60 | 98.31 | −0.82 | 0.34 | 0.22 |
| 80H-70Ala | 1.34 | 0.59 | 98.33 | −0.80 | 0.33 | 0.21 |

80H: The formulation containing 80 mM histidine.
80H-70His: The formulation containing 150 mM histidine.
80H-70Lys: The formulation containing 80 mM histidine and 70 mM lysine.
80H-70Thr: The formulation containing 80 mM histidine and 70 mM threonine.
80H-70Ser: The formulation containing 80 mM histidine and 70 mM serine.
80H-70Pro: The formulation containing 80 mM histidine and 70 mM proline.
80H-70Val: The formulation containing 80 mM histidine and 70 mM valine.
80H-70Ala: The formulation containing 80 mM histidine and 70 mM alanine.

TABLE 5

SEC-HPLC analysis of formulations containing specified concentration of amino acid after storage at 40° C. for 8 weeks

| Sample | Sum HMW (%) | Increases HMW (%) | Main-peak (%) | Increases Main-peak (%) | Sum LMW (%) | Increases LMW (%) |
|---|---|---|---|---|---|---|
| 80H | 2.09 | 1.32 | 92.8 | −6.31 | 5.12 | 4.99 |
| 80H-70His (150H) | 1.91 | 1.17 | 92.91 | −6.23 | 5.18 | 5.05 |
| 80H-70Lys | 2.00 | 1.25 | 92.89 | −6.23 | 5.11 | 4.98 |
| 80H-70Thr | 2.04 | 1.29 | 92.77 | −6.35 | 5.19 | 5.07 |
| 80H70Ser | 2.13 | 1.38 | 92.7 | −6.43 | 5.17 | 5.05 |
| 80H-70Pro | 1.95 | 1.19 | 92.78 | −6.34 | 5.27 | 5.15 |
| 80H-70Val | 2.05 | 1.30 | 92.81 | −6.32 | 5.16 | 5.04 |
| 80H-70Ala | 2.07 | 1.32 | 92.76 | −6.37 | 5.18 | 5.06 |

80H: The formulation containing 80 mM histidine.
80H-70His: The formulation containing 150 mM histidine.
80H-70Lys: The formulation containing 80 mM histidine and 70 mM lysine.
80H-70Thr: The formulation containing 80 mM histidine and 70 mM threonine.
80H-70Ser: The formulation containing 80 mM histidine and 70 mM serine.
80H-70Pro: The formulation containing 80 mM histidine and 70 mM proline.
80H-70Val: The formulation containing 80 mM histidine and 70 mM valine.
80H-70Ala: The formulation containing 80 mM histidine and 70 mM alanine.

The results of Tables 4 and 5 indicated that there were no significant differences in the increase of the fragments (increase LMW %) among the test formulations, and the formulations comprising 80 mM histidine buffer alone and 80 mM histidine buffer with the addition of 70 mM threonine, 70 mM serine, 70 mM valine or 70 mM alanine had similar purity loss (i.e., the percentage of the Increases Main-peak (%)) and generation of aggregates (increases HMW (%)) after the heat acceleration. Further, the formulation containing 70 mM lysine or proline in 80 mM histidine buffer displayed lower purity loss and increases It is determined that the anti-IL6R antibody could be stably stored in the formulation comprising histidine having a concentration of no less than 30 mM without adding other stabilizer or amino acids such as arginine or methionine.

Example 4 Effect of Histidine and Lysine on the Stability of Tocilizumab in Acetate Buffer To further clarify the stabilizing effect of histidine on protein stability in low pH condition, 180 mg/ml of Tocilizumab was dissolved in the acetate buffer at pH 5.4 with or without the addition of amino acid selected from 1.5% histidine HCl (78 mM histidine, sample ID: A1.5H3S), 2.5% histidine HCl (130 mM histidine, sample ID: A2.5H), 1.5% lysine HCl (82.1 mM lysine, sample ID: A1.5L3S), or 2.5% lysine HCl (136.9 mM lysine, sample ID: A2.5L) in the presence of the excipient of 0.03% (w/v) polysorbate 80, wherein the formulations containing 1.5% of amino acid (i.e., A1.5L3S, and A1.5H3S) were further added with 3% sucrose as the stabilizer. Formulations without the addition of amino acids (Sample ID: A, and A3S) served as the control group in the experiment. These prepared formulations were subjected to 8 weeks of storage at 25° C. or 40° C. and then were analyzed by SEC-HPLC. The results were respectively summarized in Tables 6 and 7.

TABLE 6

SEC-HPLC analysis of formulations containing specified concentration of amino acid after storage at 25° C. for 8 weeks

|        | HMW % | Increases HMW % | Main-peak % | Increases Main-peak % | LMW % | Increases LMW % |
|--------|-------|-----------------|-------------|-----------------------|-------|-----------------|
| A      | 2.66  | 0.92            | 97.06       | −1.09                 | 0.28  | 0.18            |
| A3S    | 2.29  | 0.96            | 97.46       | −1.12                 | 0.26  | 0.17            |
| A2.5L  | 1.61  | 0.67            | 98.13       | −0.83                 | 0.27  | 0.18            |
| A1.5L3S| 1.67  | 0.70            | 98.07       | −0.87                 | 0.26  | 0.17            |
| A2.5H  | 1.07  | 0.33            | 98.64       | −0.53                 | 0.29  | 0.20            |
| A1.5H3S| 1.16  | 0.38            | 98.56       | −0.57                 | 0.27  | 0.18            |

A: The formulation without any amino acid and sucrose.
A3S: The formulation containing 3% sucrose.
A2.5L: The formulation containing 2.5% (about 136.9 mM) lysine HCl and 0% sucrose.
A1.5L3S: The formulation containing 1.5% (about 82.1 mM) lysine HCl and 3% sucrose.
A2.5H: The formulation containing 2.5% (about 130 mM) histidine HCl and 0% sucrose.
A1.5H3S: The formulation containing 1.5% (about 78 mM) histidine HCl and 3% sucrose.

TABLE 7

SEC-HPLC analysis of formulations containing specified concentration of amino acid after storage at 40° C. for 8 weeks

|        | HMW % | Increases HMW % | Main-peak % | Increases Main-peak % | LMW % | Increases LMW % |
|--------|-------|-----------------|-------------|-----------------------|-------|-----------------|
| A      | 3.66  | 1.92            | 92.04       | −6.11                 | 4.30  | 4.20            |
| A3S    | 3.32  | 1.99            | 92.21       | −6.37                 | 4.47  | 4.38            |
| A2.5L  | 2.59  | 1.65            | 92.76       | −6.20                 | 4.64  | 4.55            |
| A1.5L3S| 2.52  | 1.55            | 93.34       | −5.60                 | 4.15  | 4.06            |
| A2.5H  | 1.76  | 1.02            | 93.05       | −6.12                 | 5.19  | 5.10            |
| A1.5H3S| 1.85  | 1.07            | 93.45       | −5.68                 | 4.69  | 4.60            |

A: The formulation without any amino acid and sucrose.
A3S: The formulation containing 3% sucrose.
A2.5L: The formulation containing 2.5% lysine HCl (equal to 136.9 mM lysine) and 0% sucrose.
A1.5L3S: The formulation containing 1.5% lysine HCl (equal to 82.1 mM lysine) and 3% sucrose.
A2.5H: The formulation containing 2.5% histidine HCl (equal to 130 mM histidine) and 0% sucrose.
A1.5H3S: The formulation containing 1.5% histidine HCl (equal to 78 mM histidine) and 3% sucrose.

The data of Tables 6 and 7 indicated that the test formulations containing 1.5% and 2.5% histidine HCl (i.e., A1.5H3S, and A2.5H) had the lower increase of high molecular weight aggregates (increase HMW %) and monomer loss (increase Main-peak %) after the storage for 8 weeks at 25° C., and also had the lower increase of high molecular weight aggregates (increase HMW %) after the storage for 8 weeks at 40° C. as compared with other samples. Moreover, the formulations containing 2.5% histidine HCl (i.e., A2.5H; equal to 130 mM histidine) had the lowest increase of high molecular weight aggregates (increase HMW %) among all the test formulations. However, the results in Table 7 also indicated that the test formulations containing 2.5% histidine HCl (i.e., A2.5H) had higher increase of low molecular weight fragments (increase LMW %) than others containing lysine HCl or without the addition of amino acid after being subjected to a 8 weeks of storage at 40° C. It suggested that high histidine concentration in the acetate buffer at low pH level might induce the generation of fragments of the anti-IL6R antibody, Tocilizumab.

Given the above, it is revealed that high histidine concentration in acetate buffer with low pH level might protect the anti-IL6R antibody against protein aggregation caused by the thermal stress but induce the increase of fragments in the meanwhile.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. An aqueous pharmaceutical formulation comprising,
an antibody that binds to the receptor of (IL)-6;
histidine at a concentration of 60 mM to 150 mM; and
a surfactant at a concentration of 0.01-0.05% (w/v);
wherein the antibody is the anti-IL-6R antibody tocilizumab and is present in the aqueous pharmaceutical formulation at a concentration of 180 mg/mL; and
wherein the aqueous pharmaceutical formulation has a pH of 5.0-6.5.

2. The aqueous pharmaceutical formulation of claim 1, wherein the histidine is present in the aqueous pharmaceutical formulation at the concentration of 60 mM to 125 mM.

3. The aqueous pharmaceutical formulation of claim 1, wherein the surfactant is polysorbate, and is present in the aqueous pharmaceutical formulation at a concentration of 0.03% (w/v).

4. The aqueous pharmaceutical formulation of claim 1, further comprising an amino acid that is present in the aqueous pharmaceutical formulation at a concentration of 1 mM to 150 mM, wherein the amino acid is selected from the group consisting of, lysine, aspartate, proline, phenylalanine, alanine, threonine, leucine, asparagine, glutamate, glutamine, serine, tryptophan, arginine, methionine, and valine.

5. The aqueous pharmaceutical formulation of claim 4, wherein the aqueous pharmaceutical formulation comprises 70 mM of lysine, threonine, serine, proline, valine, or alanine.

6. The aqueous pharmaceutical formulation of claim 5, wherein the aqueous pharmaceutical formulation comprises 70 mM valine.

7. The aqueous pharmaceutical formulations of claim 1 comprising:
tocilizumab at a concentration of 180 mg/ml;
histidine at a concentration of 80 mM;
polysorbate 80 at a concentration of 0.03% (w/v);
an amino acid selected from the group consisting of lysine, threonine, serine, proline, valine, and alanine, wherein the amino acid is present at a concentration of 70 mM; and
wherein the aqueous pharmaceutical formulation has a pH of 6.0.

8. The aqueous pharmaceutical formulation of claim 7, wherein the amino acid is valine.

9. An aqueous pharmaceutical formulation comprising:
an anti-IL-6R antibody tocilizumab at a concentration of 180 mg/mL;
histidine at a concentration of 60 mM to 125 mM;
polysorbate at a concentration of 0.02-0.04% (w/v); and
an amino acid selected from the group consisting of lysine, threonine, serine, proline, valine, and alanine at a concentration of 50 mM to 90 mM; and
wherein the aqueous pharmaceutical formulation has a pH of 5.8-6.2.

10. The aqueous pharmaceutical formulation of claim 9, wherein the amino acid is valine.

11. An aqueous pharmaceutical formulation comprising,
an antibody that binds to the receptor of (IL)-6;
histidine at a concentration of 60 mM to 150 mM; and
a surfactant at a concentration of 0.01-0.05% (w/v);
wherein the antibody is the anti-IL-6R antibody tocilizumab and is present in the aqueous pharmaceutical formulation at a concentration of 180 mg/mL; and
wherein the aqueous pharmaceutical formulation has a pH of 5.0-6.5,
wherein the purity of the formulation is higher as compared to a formulation comprising histidine at a concentration lower than 60 mM.

12. An aqueous pharmaceutical formulation comprising,
an antibody that binds to the receptor of (IL)-6;
histidine at a concentration of 60 mM to 150 mM; and
a surfactant at a concentration of 0.01-0.05% (w/v);
wherein the antibody is the anti-IL-6R antibody tocilizumab and is present in the aqueous pharmaceutical formulation at a concentration of 180 mg/mL; and
wherein the aqueous pharmaceutical formulation has a pH of 5.0-6.5,
wherein the formulation does not comprise arginine.

* * * * *